United States Patent [19]

Stein

[11] 4,235,321
[45] Nov. 25, 1980

[54] SAFETY CLUTCH FOR THE DRIVE OF FLOOR CLEANING MACHINES

[76] Inventor: Klaus Stein, No. 12, Diesterwegstrasse, 5620 Velbert-Neviges 15, Fed. Rep. of Germany

[21] Appl. No.: 885,238

[22] Filed: Mar. 10, 1978

[30] Foreign Application Priority Data

Sep. 17, 1977 [DE] Fed. Rep. of Germany ....... 2741912

[51] Int. Cl.² .............................................. F16D 7/02
[52] U.S. Cl. ................................. 192/56 R; 15/390; 192/89 B; 192/96
[58] Field of Search ................. 192/56 L, 56 R, 89 B, 192/96; 15/390; 64/29

[56] References Cited

U.S. PATENT DOCUMENTS

| 1,883,225 | 10/1932 | Wood | 192/56 L |
|---|---|---|---|
| 2,535,046 | 12/1950 | Curry | 192/89 B X |
| 2,728,252 | 12/1955 | Connell | 192/89 B X |
| 2,858,920 | 11/1958 | Doble | 192/89 B |
| 3,228,209 | 1/1966 | Hersey | 64/29 |
| 3,797,621 | 3/1974 | James | 192/56 R |
| 4,004,667 | 1/1977 | Vaitys | 192/56 R |
| 4,053,980 | 10/1977 | Poehlman | 192/56 R X |

*Primary Examiner*—Rodney H. Bonck
*Attorney, Agent, or Firm*—John C. Smith, Jr.

[57] ABSTRACT

A safety clutch for the drive of floor cleaning machines comprises at least one first dog and at least one second dog which are in engagement with one another and oppose each other and the input and output for transmitting torque. One of the dogs is arranged axially resilient so that it upon exceeding a predetermined torque is capable of being brought from the engagement into the disengagement position and vice versa by an axial force thereby resulting.

6 Claims, 7 Drawing Figures

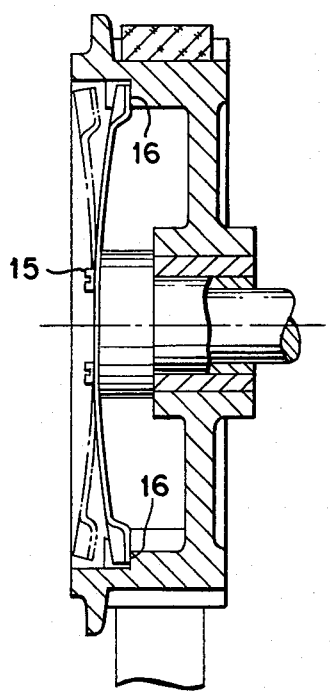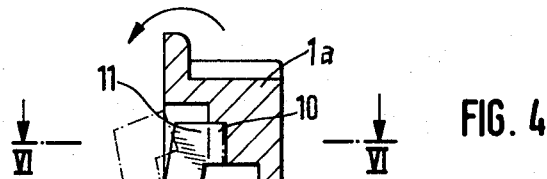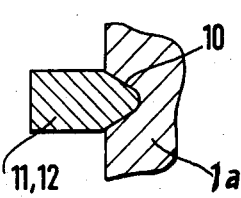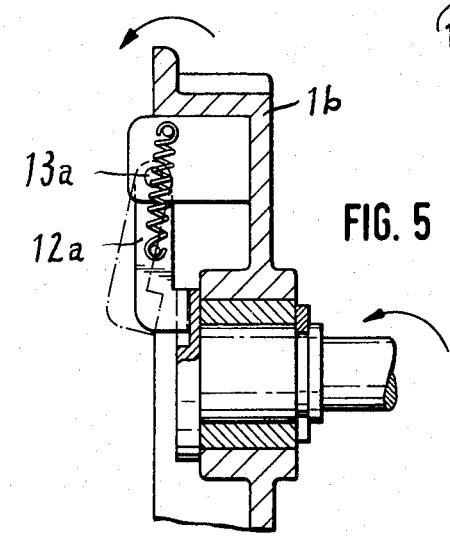

SAFETY CLUTCH FOR THE DRIVE OF FLOOR CLEANING MACHINES

BACKGROUND OF THE INVENTION

In floor cleaning machines which generally operate with a circular brush rotating about one or two horizontal axes, said brush is driven via a drive disc by a drive motor by means of a flat or circular belt as power transmission. In order to avoid too high a slip on this belt, it must be provided with an adequate prestressing. This results in an additional bearing loading which is greater than the one occuring by the function of the brush. The prestressing also impairs the operation life of the belt. The operation life of the belt is even further shortened by the fact that in not seldom cases of blocking of the rotating brush, e.g. as a result of rug corners clamped in between the brush and the housing or other objects clamped in in this way, the belt slips on the drive disc.

In order to avoid these disadvantages, in other designs, a positive mechanical power transmission is used by means of a gear belt. This, however, can also be destructed in the event the machine is equipped with a strong drive motor and the brush is stopped by blocking.

Thus, means are required which interrupt the power transmission in case of a too high load or even in case of a blocking of the brush. In this regard, a structure is known comprising a heat responsive friction clutch for the protection of the power transmission member. The required friction forces are produced by heat-responsive pressure-engagement springs, so-called bi-metallic springs.

The friction heat generated by blocking causes a deformation of the bi-metallic springs as a result of the material-specific properties thereof and thus a relaxing of the pressure engagement forces, the friction force and the friction heat thereby decreasing (cf. German patent specification No. 2,312,636).

The disadvantage of this known design is the stringent wear of the friction liners provided which continuously slip—initially more and later less—on the countersurface and in doing so generate heat. This likewise results in a reduction of the transmittable torque, a functional reduction of the brush and—as a result of heating up—a drying of the bearings which may then seize.

The same disadvantage is inherent to the safety clutch according to U.S. patent specification No. 3,228,209. The dogs slide on one another in overload conditions and in doing so generate both noise and also troublesome heat. Also, detrimental wear occurs.

SUMMARY OF THE INVENTION

It is, therefore, an object of the present invention to avoid these disadvantages and to provide a safety clutch in which the brush drive is completely interrupted in overload conditions so that heat and wear are no longer produced and a stopping of the drive motor is not required.

It is another object of this invention to provide a safety clutch for the drive of floor cleaning machines, in which, after eliminating the trouble which has braked or even blocked the brush, a depressing of an engagement device suffices in order to re-engage the safety clutch.

It is a further object of this invention to provide a safety clutch for the drive of floor cleaning machines which offers an important simplification of manipulation to housewives who are not always sufficiently informed in technical aspects.

BRIEF DESCRIPTION OF THE DRAWINGS

Three embodiments of the invention will now be described by way of example and with reference to the accompanying drawings, in which:

FIG. 4 is a sectional view of a second embodiment;

FIG. 5 is a sectional view of an alternative embodiment of the embodiment shown in FIG. 4, showing a different lever arrangement; and FIG. 6 is a sectional view taken on the line VI—VI of FIG. 4;

FIG. 7 is a sectional view of an alternative embodiment of the embodiment shown in FIGS. 1 and 3.

DESCRIPTION OF THE PREFERRED EMBODIMENTS

Figure 1:
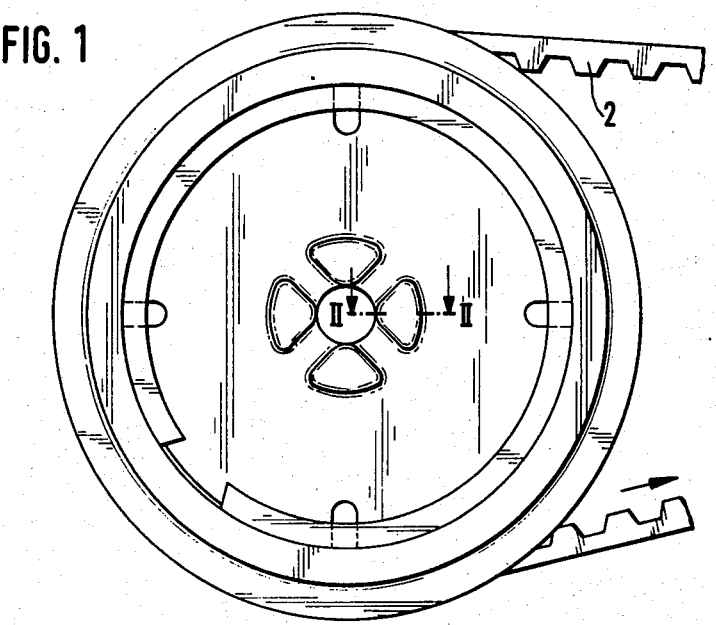
FIG. 1 is a cross section of the line I—I of FIG. 3, showing an end view of the drive disc and the resilient disc according to a first embodiment.
Figure 3:
FIG. 3 is an elevational view of the drive, partly in section, adjacent housing parts being illustrated broken-away.
Figure 2:
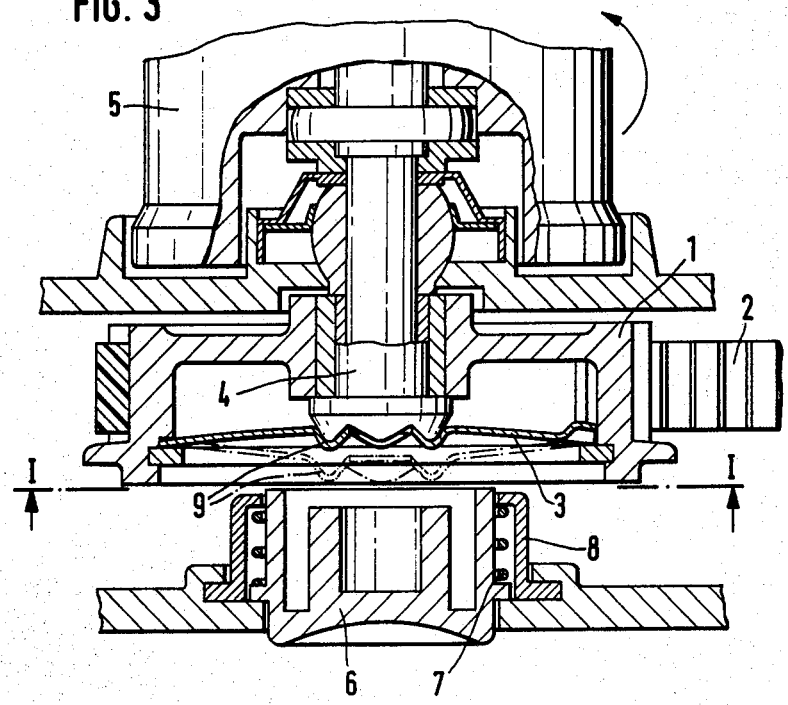
FIG. 2 is a sectional view of one of the dogs along the line II—II of FIG. 1.

In FIG. 3, the reference numeral 1 designates a drive disc wherein the hub is arranged unilaterally offset at the edge of the disc. A drive belt 2 travels on this drive disc 1, said drive belt taking over the power transmission from a drive motor (not illustrated).

Within the drive disc 1, a dished resilient disc 3 is mounted which is secured against rotation. Said latter disc carries depressions as dogs 9 generally in the center, into which dogs projecting dogs arranged on the face of the shaft 4 of a brush 5 engage in the engaged position of the resilient disc 3. Upon exceeding a predetermined torque, said projecting dogs urge the resilient disc 3 into the disengagement position shown in phantom. Thereby, the dogs are out of engagement, and torque transmission ceases.

For a re-engagement of the safety clutch, a push button 6 is provided as shown in FIG. 3. The push button 6 is operable in counteraction to the force of a reset spring 7. The push button 6 is mounted in a housing 8 which in turn is arranged in the side wall of a housing encasing the drive and the brush. The push button 6 may be connected to indicating means (not illustrated) which indicate the clutching condition of the clutch, i.e. whether it is engaged or disengaged.

The safety clutch according to FIGS. 4 and 5 is of a different design, but operates following the same principle as the one described above. In the embodiment according to FIG. 4, recesses 10 are provided in the face of the drive disc 1a (see also FIG. 6). A dog 11 engages in these recesses 10, which dog is arranged at one end of a lever 12. The lever 12 is pivotable about a spigot 13 and is retained by a spring 14 in the engagement or disengagement position. When moving into these positions, the lever 12 passes a dead-center position. Stops (not illustrated) serve to secure the lever 12 in the disengagement position.

The clutch according to FIG. 5 shows the same structure with the difference that the recesses or concave dogs are arranged in the face of a sort of hub of the output shaft, while the lever 12a carrying the dog is mounted with its spigot 13a within the drive disc 1b.

FIG. 8 illustrates an arrangement which includes a linkage 18 connected to a plate 17 which in turn is mounted on resilient disc 3. When the predetermined torque is exceeded the resilient disc 3 is displaced and the plate 17 is forced into the position illustrated with phantom lines and thus the linkage 18 which is mounted in a point of rotation 21 is likewise shifted. The button 19 secured to the linkage 18 emerges through the opening 22 of the sidewall 20 of the device. The projecting button 19 at the same time serves as an indication device for the position of the clutch as well as for repositioning the resilient disc 3 into the engaged position.

In all five embodiments, the drive disc is illustrated as a gear disc for a gear belt. Of course, also a usual smooth belt may be used.

The invention may be embodied in other specific forms without departing from the spirit or the essential characteristics thereof. The embodiments therefore are to be considered in all respects as illustrative and not restrictive. For instance, the safety clutch according to the invention is not only suited for the above-described drive means, but is also usable for a drive means of a friction wheel or by means of gears.

What is claimed is:

1. A safety clutch for the drive of a floor cleaning machine comprising:
  (a) a rotary drive member and a rotary driven member mounted for independent rotation about a common axis;
  (b) one of said members comprising means defining at least one first cam-shaped dog spaced from said axis and facing the other of said members; and
  (c) the other of said members comprising a dished axially resilient disc, a drive disc and means securing said resilient disc at its circumference to said drive disc to prevent rotation of said resilient disc relative to said drive disc, said resilient disc being movable between convex and concave configurations and including at least one second cam-shaped dog complementary to said at least one first dog and located inwardly of said circumference of said resilient disc, said resilient disc being adapted to retain said at least one second dog at either a stable engaged position in contact with said at least one first dog or a stable disengaged position axially spaced from said at least one first dog;
  (d) whereby torque is transmitted from said drive member to said driven member when said at least one second dog is in said engaged position and upon exceeding a predetermined torque said at least one second dog is axially forced from said engaged position to said disengaged position.

2. A safety clutch according to claim 1 wherein said drive member comprises said at least one first dog and said driven member comprises said disc and at least one second dog.

3. A safety clutch according to claim 1 wherein said one member comprises a plurality of said first dogs arranged about said axis and said other member comprises an equal number of said second dogs arranged in said disc about said axis.

4. A safety clutch according to claim 1 wherein said at least one second dog is integral with said resilient disc.

5. A safety clutch according to claim 1 further comprising actuation means for pressing said resilient disc to axially force said at least one second dog from said disengaged position to said engaged position to reengage said clutch.

6. A safety clutch according to claim 1 wherein said first and second dogs engage one another, when said disc is in said engaged position, with surfaces inclined relative to the axis of rotation providing a component of force in an axial direction derived from the circumferential force of the transmitted torque.

* * * * *